E. N. GILLHAM.
STANCHION.
APPLICATION FILED JAN. 12, 1917.
1,282,214.
Patented Oct. 22, 1918.
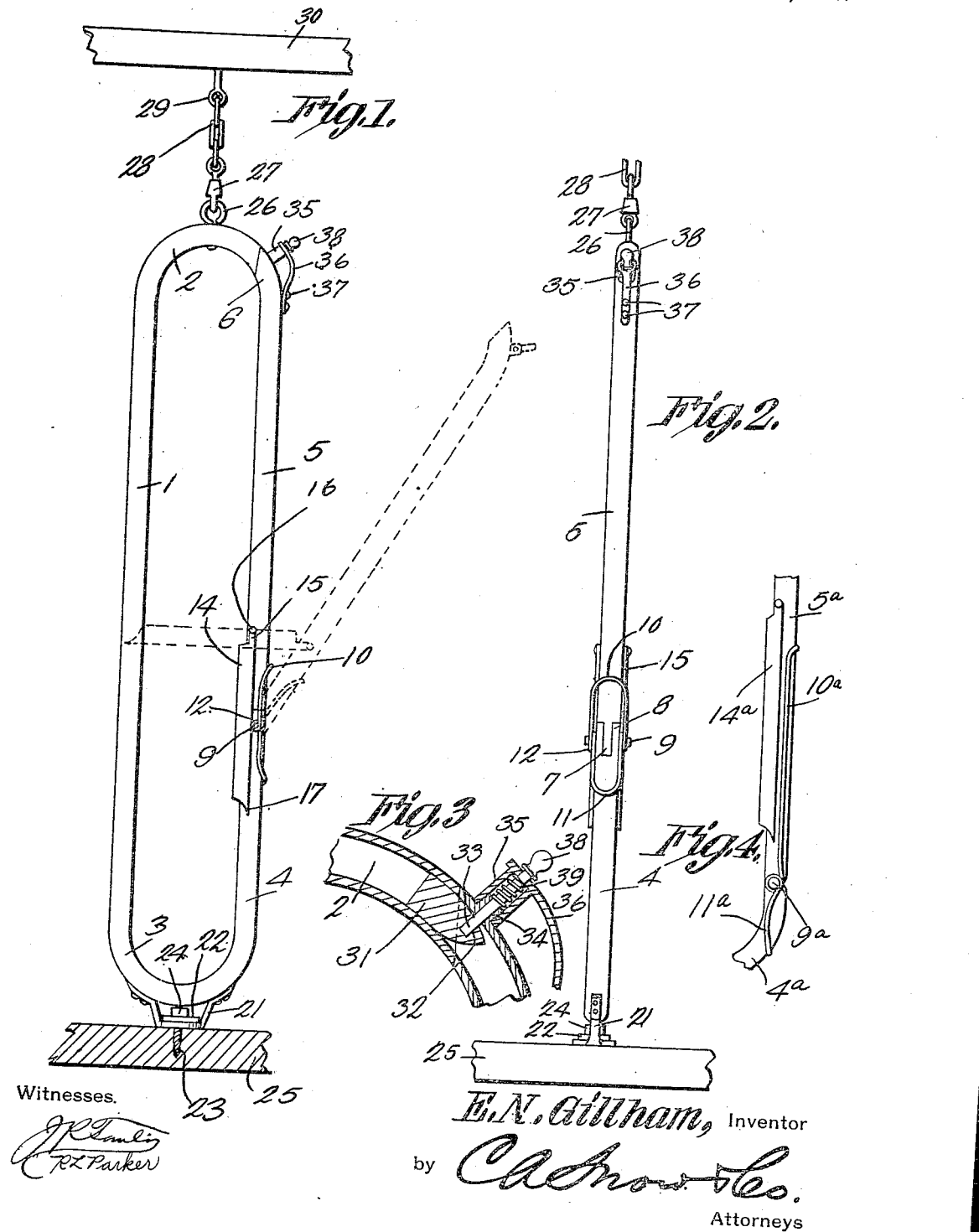
E. N. Gillham, Inventor
Witnesses.

UNITED STATES PATENT OFFICE.

ERASTUS NEWTON GILLHAM, OF WINCHESTER, ILLINOIS.

STANCHION.

1,282,214.  Specification of Letters Patent.  Patented Oct. 22, 1918.

Application filed January 12, 1917. Serial No. 142,037.

*To all whom it may concern:*

Be it known that I, ERASTUS N. GILLHAM, a citizen of the United States, residing at Winchester, in the county of Scott and State of Illinois, have invented a new and useful Stanchion, of which the following is a specification.

The device forming the subject matter of this application is a stanchion, and one object of the invention is to provide a stanchion which may be made out of metal, preferably piping or tubing, at a trifling expense.

Another object of the invention is to provide novel means whereby the upper portion of the stanchion will be held in an open position to receive the neck of the animal, the said upper portion of the stanchion being releasable when the animal moves its neck downwardly, within the contour of the stanchion.

Another object of the invention is to provide novel spring means for actuating the keeper.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in side elevation, a stanchion embodying the present invention;

Fig. 2 is a side elevation wherein the stanchion is viewed at right angles to the showing of Fig. 1;

Fig. 3 is a sectional detail illustrating the latch mechanism whereby the keeper is maintained engaged with the top of the stanchion; and Fig. 4 is a side elevation showing a slight modification in the invention.

The stanchion forming the subject matter of this application includes a main member 1 which is made out of metal. The member 1 may be constructed of pipe if desired. Adjacent its upper end, the main member 1 is bent upon a radius to form an arcuate head 2. Adjacent its lower end, the main member 1 is bent upon a radius to form an arcuate foot 3 terminating in an upstanding extension 4 disposed parallel to the main member 1. The numeral 5 denotes a metal keeper which may be made of pipe if desired. Adjacent its upper end, the keeper 5 is curved as shown at 6 to form a continuation of the arcuate head 2. The keeper 5 is equipped at its lower end with a tongue 7 received between ears 8 formed on the upper end of the extension 4. Through the tongue 7 and through the ears 8 is passed a pivot element 9, the pivot element serving so to mount the keeper 5 that the same may be swung backwardly and forwardly, between the solid and dotted line positions of Fig. 1.

The invention comprises a loop-shaped spring including a top 10 and a bottom 11. The top 10 bears at its upper end against the outer edge of the keeper 5, and the bottom 11 bears at its lower end against the outer edge of the extension 4. The top 10 and the bottom 11 of the loop-shaped spring are connected by coiled intermediate portions 12 engaged around the ends of the pivot element 9. When the keeper 5 is swung outwardly from the solid line position of Fig. 1 to the dotted line position of Fig. 1, the spring comprising the parts 10—11—12 tends to return the keeper to the solid line position of the said figure. In this connection, it is to be noted that when the keeper 5 is swung outwardly from the solid line position of Fig. 1 to the dotted line position of the said figure, the coiled intermediate portions 12 of the spring tend to loosen their hold, that is, their circumferential grip, upon the ends of the pivot element 9, so that the friction of the said coiled intermediate portions of the spring on the ends of the pivot element is reduced.

The numeral 14 denotes a spreader which is trough-shaped in cross section. At one end, the spreader 14 is cut away to form ears 15 located on opposite sides of the keeper 5. The ears 15 are secured to the keeper 5 by means of pivot elements 16. At its rear end 17, the spreader 14 is notched to straddle the main member 1. When the keeper 5 is swung outwardly into the dotted line position of Fig. 1, the end 17 of the spreader is engaged with the member 1, and thus the keeper 5 is held in the dotted line position shown in the drawings. When an animal inserts its head within the contour of the stanchion, and when the animal lowers its head, as in the act of eating, the end 17 of the spreader 14 will be detached from the member 1, whereupon the free end 17 of the spreader 14 will swing downwardly into the solid line position of Fig. 1, the keeper 5 swinging to a closed position under the action of the spring 10—11—12.

Attached to the arcuate foot 3 of the main member 1 is a yoke 21 within the contour of which is located a washer 22 through which passes a securing element 23, having a head 24 engaging the washer. The securing element 23, which may be a screw, is mounted in a lower support 25. The arcuate head 2 of the main member 1 carries an eye 26 connected by a swivel 27 with a chain 28 assembled with an eye 29 carried by an overhead support 30.

Any suitable means may be provided whereby, when the keeper 5 swings from the dotted line position of Fig. 1 to the closed position of Fig. 1, the curved end 6 of the keeper will be automatically latched on the arcuate head 2 of the main member 1. If desired, as shown in Fig. 3, a beveled block 31 may be mounted in the depending end of the arcuate head 2, the block 31 having a recess 32 in its outer surface. The recess 32 is adapted to receive a latch pin 33. The latch pin 33 is mounted in the boss 34 on the outer face of the end 6 of the keeper. Threaded onto the boss 34 is a tube 35 secured to an arm 36 attached by securing elements 37 to the end 6 of the keeper 5. The pin 34 slides in the arm 36 and is provided with an exposed knob 38. A compression spring 39 is interposed between the arm 36 and the end of the boss 34. By pulling the pin 33 outwardly, through the instrumentality of the head 38, the inner end of the pin 33 may be detached from the recess 32, whereupon the keeper 5 may be swung into an open position as indicated in dotted line in Fig. 1. When, however, the keeper 5 swings from the dotted line position of Fig. 1 to the solid line position of said figure, the inner end of the latch pin 33 rides on the outer surface of the block 31 and engages automatically in the seat or recess 32.

The operation of the structure has been dealt with hereinbefore, in connection with the various parts described, but briefly considered is as follows:—

When the keeper 5 is in open position, the spreader 14 is engaged with the main member 1. When an animal depresses its head within the contour of the stanchion, the inner end 17 of the spreader 14 is detached from the member 1, whereupon the keeper 5 swings to a closed position, under the action of the spring 10—11—12, the upper end of the keeper being automatically locked to the arcuate head 2 of the main member 1, by the latch mechanism shown in Fig. 3, the spreader 14 swinging into the depending position shown in Fig. 1.

In Fig. 4 of the drawings, a slight modification of the invention is shown. In the said figure, the parts hereinbefore described have been designated by numerals previously used, with the suffix "a." In this form of the invention, the extension 4$^a$ of the stanchion is made shorter than the extension 4 of Fig. 1, and the keeper 5$^a$ is made longer than the keeper 5, the pivot element 9$^a$, consequently, being in a lower position than that occupied by the pivot element 9 of Fig. 1, and the link of the part 10$^a$ of the spring being increased accordingly.

Having thus described the invention, what is claimed is:—

1. A stanchion comprising a main member including a body and an upstanding extension; a keeper pivoted to the extension; a spreader bifurcated at its ends to straddle the keeper and the body of the main member, the spreader being of trough shape to fit about the keeper and the extension when the spreader is in a depending position, thereby to encumber the interior of the stanchion to a minimum degree; and means for pivoting one bifurcated end of the spreader to the keeper.

2. In a stanchion, a main member comprising a head and a foot, the head being provided with a reduced projection having a recess; a keeper pivoted to the foot and coacting with the head, the keeper being hollow at its upper end, to receive the projection, the keeper being provided with an exterior boss; a tube threaded onto the boss and provided with an arm whereby the tube may be rotated; means for securing the arm to the keeper; and a latch slidable in the tube and in the boss and coöperating with the recess of the projection.

3. A stanchion comprising an upstanding extension; a keeper; a pivot element uniting the keeper and the extension and located between the inner and outer edges of the keeper and the extension; and a loop-shaped spring engaged in its intermediate portion around the pivot element and comprising terminal bends engaging the outer edges of the keeper and the extension, the side portions of the spring being located between the inner and outer edges of the keeper and the extension, thereby to encumber the outer edges of the keeper and the extension to a minimum degree.

In testimony that I claim the foregoing as my own, I have hereto affixed my signature in the presence of two witnesses.

ERASTUS NEWTON GILLHAM.

Witnesses:
GEO. W. HOGAN,
M. W. SAPPINGTON.

Copies of this patent may be obtained for five cents each, by addressing the "Commissioner of Patents, Washington, D. C."